(12) United States Patent
Chang et al.

(10) Patent No.: US 8,237,890 B2
(45) Date of Patent: Aug. 7, 2012

(54) 3D GRID CONTROLLABLE LIQUID CRYSTAL LENS AND MANUFACTURING METHOD THEREOF

(75) Inventors: Chi-Lone Chang, Hsinchu County (TW); Chi-Yuan Chin, Hsinchu (TW)

(73) Assignee: Silicon Touch Technology Inc., Hsinchu (TW)

( * ) Notice: Subject to any disclaimer, the term of this patent is extended or adjusted under 35 U.S.C. 154(b) by 143 days.

(21) Appl. No.: 12/898,721

(22) Filed: Oct. 6, 2010

(65) Prior Publication Data

US 2011/0090451 A1 Apr. 21, 2011

(30) Foreign Application Priority Data

Oct. 19, 2009 (TW) .............................. 98135278 A

(51) Int. Cl.
*G02F 1/1347* (2006.01)
(52) U.S. Cl. ............................................. 349/74; 349/75
(58) Field of Classification Search ............... 349/74–75
See application file for complete search history.

(56) References Cited

U.S. PATENT DOCUMENTS

| | | | |
|---|---|---|---|
| 5,867,238 A | 2/1999 | Miller et al. | |
| 5,976,405 A | 11/1999 | Clikeman et al. | |
| 6,002,383 A | 12/1999 | Shimada | |
| 6,271,898 B1 | 8/2001 | Clikeman et al. | |
| 6,452,650 B1 | 9/2002 | Nakao et al. | |
| 6,476,887 B1 | 11/2002 | Sekine et al. | |
| 6,497,928 B1 | 12/2002 | Sato et al. | |
| 6,665,042 B1 | 12/2003 | Marshall et al. | |
| 6,815,016 B2 | 11/2004 | Kyu et al. | |
| 6,859,333 B1 | 2/2005 | Ren et al. | |
| 6,864,931 B1 | 3/2005 | Kumar et al. | |
| 6,897,936 B1 | 5/2005 | Li et al. | |
| 6,898,021 B1 | 5/2005 | Tang | |
| 7,029,728 B2 | 4/2006 | Dunn et al. | |
| 7,034,907 B2 | 4/2006 | West et al. | |
| 7,038,743 B2 | 5/2006 | Komitov et al. | |
| 7,038,754 B2 | 5/2006 | Hirakata et al. | |
| 7,042,549 B1 | 5/2006 | Ren et al. | |
| 7,079,203 B1 | 7/2006 | Huang et al. | |
| 7,102,706 B2 | 9/2006 | Kim et al. | |

*Primary Examiner* — Phu Vu
(74) *Attorney, Agent, or Firm* — Jianq Chyun IP Office

(57) ABSTRACT

A 3D grid controllable liquid crystal lens is provided. In the 3D grid controllable liquid crystal lens, at least two layers of a plurality of active device arrays are stacked on a first substrate, and a plurality of liquid crystal layer are respectively disposed on the active device arrays. Then, a driving voltage applied on each active device array is suitably controlled to control the orientation of the liquid crystal molecules, so as to generate a refractive index distribution similar to gradient-index lens in the 3D grid controllable liquid crystal lens. Therefore, the 3D grid controllable liquid crystal lens has a focusing function for focusing/diverging the light, similar to a convex lens or a concave lens. A method for manufacturing the 3D grid controllable liquid crystal lens is also provided.

22 Claims, 12 Drawing Sheets

3D GRID CONTROLLABLE LIQUID CRYSTAL LENS AND MANUFACTURING METHOD THEREOF

CROSS-REFERENCE TO RELATED APPLICATION

This application claims the priority benefit of Taiwan application serial no. 98135278, filed on Oct. 19, 2009. The entirety of the above-mentioned patent application is hereby incorporated by reference herein and made a part of this specification.

BACKGROUND OF THE INVENTION

1. Field of the Invention

The invention generally relates to a liquid crystal lens and a manufacturing method thereof, and more particularly, to a three-dimensional (3D) grid controllable liquid crystal lens and a manufacturing method thereof.

2. Description of Related Art

In a common lens system, when a lens apparatus has an adjustable optical zoom function, each of the lens groups located inside the lens apparatus must generate corresponding movements to accommodate changes in the zoom ratio. In a conventional mechanical design of a miniature optical zoom lens, the mechanical design usually requires at least two driving apparatuses. That is, at least two step motors, ultra-sonic motors, piezoelectric transducers, and the like are required as the driving source.

However, implementing the zoom lens in this manner results in a bulky yet complicated structure, in contrast to a goal of product miniaturization and portability. Moreover, the relative movements of each lens group requires a position sensor and a close-loop controller to implement, which goes against a requirement of consumer products in simplicity and low price.

Moreover, besides using high cost precision driving devices as the motor sources (e.g., stepper motors, ultra-sonic motors, piezoelectric transducers) of the lens groups, the mechanical focus and zoom structures used in a common lens apparatus further employ a plurality of miniature gears, cam wheels, turbines, and the like transmission devices. Therefore, not only are the structural framework more complicated, the assembly steps made more difficult and numerous, the size more bulky and the cost more expensive, but power consumption has also exponentially increased.

Consequently, in order to alleviate the aforementioned issues, an adjustable zoom liquid crystal lens that can decrease structural complexity and minimize the bulk for the above-described lens apparatus has become increasingly important. Here, related researches are described below.

In U.S. Pat. No. 7,079,203, the disclosure proposes using a polymer network liquid crystal (PNLC) method to achieve the optical functions of the lenses. However, since the optical functions are not achieved with a single apparatus/module, consumer use is not possible due to difficulty in implementation.

Moreover, in U.S. Pat. No. 7,042,549, the disclosure proposes using a polymer dispersed liquid crystal (PDLC) process to achieve lens functions using liquid crystal droplets. However, a lens scaling modular structure is not proposed in this disclosure.

In U.S. Pat. No. 7,102,706, the disclosure proposes a method of grouping liquid crystal molecules in a PNLC. Similarly however, since the optical functions are not achieved with a single apparatus/module, consumer usage is not possible due to difficulty in implementation.

Moreover, in U.S. Pat. No. 6,898,021, the disclosure proposes a structure having a single tunable liquid crystal lens. The disclosure does not propose using PNLC to achieve lens functions, and the optical system proposed is not a multi-stage liquid crystal lens structure.

In U.S. Pat. No. 6,859,333, the disclosure proposes an apparatus utilizing electric field variations to change the light paths in a liquid crystal lens. However, since the proposed apparatus does not have a modular structure, consumer application is still limited due to implementation difficulties.

Similarly, in U.S. Pat. Nos. 5,867,238, 5,976,405, 6,002,383, 6,271,898, 6,452,650, 6,476,887, 6,497,928, 6,665,042, 6,815,016, 6,864,931, 6,897,936, 7,029,728, 7,034,907, 7,038,743 and 7,038,754, the disclosures proposed various methods of using a liquid crystal lens, and more specifically, structures including a PNLC mixture and a stop. However, these disclosures do not describe a scaling device or a modular structure.

SUMMARY OF THE INVENTION

An aspect of the invention provides a three-dimensional (3D) grid controllable liquid crystal lens which has an optical focusing function by electrically controlling an internal refractive index distribution.

An aspect of the invention provides a manufacturing method of a 3D grid controllable liquid crystal lens which can fabricate the above-described 3D grid controllable liquid crystal lens.

An aspect of the invention provides a 3D grid controllable liquid crystal lens, including a first substrate, a plurality of first active device arrays, a first insulating layer, a plurality of first spacers, a plurality of second active device arrays, a second insulating layer, a plurality of second spacers, a plurality of third active device arrays, a second substrate, a plurality of third spacers, and a plurality of liquid crystal layers. The first active device arrays are disposed on the first substrate, and each of the first active device arrays includes a thin film transistor, a storage capacitor, and a transparent electrode electrically connected to the thin film transistor. The first insulating layer is disposed above the first active device arrays. The first spacers are disposed on the first substrate and support the first insulating layer, so as to form a first containing space between the first insulating layer and the first active device arrays. The second active device arrays are disposed on the first insulating layer, and each of the second active device arrays includes a thin film transistor, a storage capacitor, and a transparent electrode electrically connected to the thin film transistor. The second insulating layer is disposed above the second active device arrays. The second spacers are disposed on the first insulating layer, so as to form a second containing space between the second insulating layer and the second active device arrays. The third active device arrays are disposed on the second insulating layer, and each of the third active device arrays includes a thin film transistor, a storage capacitor, and a transparent electrode electrically connected to the thin film transistor. The second substrate includes a common electrode disposed thereon and arranged opposite to the first substrate, and the common electrode is arranged between the second substrate and the third active device arrays. The third spacers are disposed on the second insulating layer and support the second substrate, so that a third containing space is formed between the second substrate and the third active device arrays. The liquid crystal layers are respectively disposed in the first containing space, the second containing space, and the third containing space.

In one embodiment of the invention, each of the first third active device arrays, second third active device arrays, and the third active device arrays further includes a gate line and a source line. The gate line and the source line are interlaced, and the gate line electrically connects to a gate of the thin film transistor, whereas the source line electrically connects to a source of the thin film transistor.

In one embodiment of the invention, the 3D grid controllable liquid crystal lens further includes a gate controller and a source controller. The gate controller is electrically connected to the gate line of the first active device arrays, the second active device arrays, and the third active device arrays, respectively. The source controller is electrically connected to the source line of the first active device arrays, the second active device arrays, and the third active device arrays, respectively.

In one embodiment of the invention, a plurality of first gate lines, second gate lines, and third gate lines and a plurality of first source lines, second source lines, and third source lines are disposed on the first substrate. The first gate lines and the first source lines are respectively electrically connected to a gate and a source of the thin film transistors of the first active device arrays. The second gate lines and the first source lines are respectively electrically connected to a gate and a source of the thin film transistors of the second active device arrays through a first through hole. The third gate lines and the first source lines are respectively electrically connected to a gate and a source of the thin film transistors of the third active device arrays through a second through hole.

In one embodiment of the invention, the 3D grid controllable liquid crystal lens further includes a gate controller and a source controller. The gate controller is electrically connected to the first gate lines, the second gate lines, and the third gate lines, respectively. The source controller is electrically connected to the first source lines, the second source lines, and the third source lines, respectively.

In one embodiment of the invention, the thin film transistors of the first active device arrays, the second active device arrays, and the third active device arrays at least includes a gate, an active layer, a source, and a drain. The drain is physically connected to the transparent electrode. When the gate is being driven, the source electrically connects to the drain via the active layer.

In one embodiment of the invention, an electrode of each of the storage capacitors and the gate belong to a same film, and another electrode of each of the storage capacitors and the source and the drain belong to a same film.

In one embodiment of the invention, the 3D grid controllable liquid crystal lens further includes a sealant disposed in a periphery of the first substrate or the second substrate, and the sealant is arranged between the first substrate and the second substrate.

In one embodiment of the invention, the first substrate and the second substrate are transparent substrates.

In one embodiment of the invention, an alignment layer is disposed on the transparent electrode of the first active device arrays, an alignment layer is disposed on the transparent electrode of the second active device arrays, an alignment layer is disposed on the transparent electrode of the third active device arrays, and an alignment layer is disposed on the common electrode, so as to perform an alignment process on the liquid crystal layers, respectively.

In one embodiment of the invention, the first spacers and the second spacers are composed of metal.

Another aspect of the invention provides a manufacturing method of a 3D grid controllable liquid crystal lens, including the following steps. First, a first substrate is provided. Thereafter, a plurality of first active device arrays are formed on the first substrate, in which each of the first active device arrays includes a thin film transistor, a storage capacitor, and a transparent electrode electrically connected to the thin film transistor. Next, a first dielectric layer is formed on the first substrate to cover the first active device arrays. Thereafter, the first dielectric layer is patterned to form a plurality of first through holes exposing the first substrate. Next, a first spacer material is injected into the first through holes, so as to form a plurality of first spacers on the first substrate. Thereafter, a first insulating layer is formed on the first dielectric layer, in which the first spacers support the first insulating layer.

Next, a plurality of second active device arrays are formed on the first insulating layer, in which each of the second active device arrays includes a thin film transistor, a storage capacitor, and a transparent electrode electrically connected to the thin film transistor. Thereafter, a second dielectric layer is formed on the first insulating layer to cover the second active device arrays. Next, the second dielectric layer is patterned to form a plurality of second through holes exposing the first insulating layer. Thereafter, a second spacer material is injected into the second through holes, so as to form a plurality of second spacers on the first insulating layer. Next, a second insulating layer is formed on the second dielectric layer, in which the second spacers support the second insulating layer. Thereafter, a plurality of third active device arrays are formed on the second insulating layer, in which each of the third active device arrays includes a thin film transistor, a storage capacitor, and a transparent electrode electrically connected to the thin film transistor. Next, a third dielectric layer is formed on the second insulating layer to cover the third active device arrays. Thereafter, the third dielectric layer is patterned to form a plurality of third through holes exposing the first insulating layer. Next, a third spacer material is injected into the third through holes, so as to form a plurality of third spacers on the second insulating layer. Thereafter, the first substrate is assembled with the second substrate. Next, the first dielectric layer, the second dielectric layer, and the third dielectric layer are removed, so as to respectively form a first containing space between the first insulating layer and the first active device arrays, a second containing space between the second insulating layer and the second active device arrays, and a third containing space between the second substrate and the third active device arrays. Thereafter, a liquid crystal material is injected between the first substrate and the second substrate, so as to form a plurality of liquid crystal layers. The liquid crystal layers are respectively disposed in the first containing space, the second containing space, and the third containing space. Moreover, a common electrode is disposed on the second substrate, and the common electrode is arranged between the second substrate and the third active device arrays. The liquid crystal layers may be injected by first performing an one drop filling (ODF) process, and thereafter performing an adhesive process to assemble the first substrate with the second substrate.

In one embodiment of the invention, forming each of the first active device arrays includes the following steps. First, a gate and an electrode of the storage capacitor are formed on the first substrate. Thereafter, a gate insulating layer is formed on the first substrate to cover the gate and the electrode of the storage capacitor. Next, an active layer is formed on the gate insulating layer above the gate. Thereafter, a patterned metal layer is formed above the active layer and the electrode of the storage capacitor, so as to form a source, a drain, and another electrode disposed above the electrode of the storage capacitor. Next, a passivation layer is formed on the first substrate to cover the source, the drain, and the other electrode of the storage capacitor, in which the passivation layer has a plurality of openings to respectively expose a portion of the drain and the other electrode. Thereafter, a transparent conductive material is formed on the passivation layer, so as to form the transparent electrode, in which the transparent electrode is electrically connected to the drain and the other electrode of the storage capacitor via the openings, respectively. In one embodiment of the invention, while forming the gate, a gate line is formed concurrently, and while forming the source, a source line is formed concurrently. The gate line is electrically connected to the gate, the source line is electrically connected to the source, and the gate line and the source line are interlaced.

In one embodiment of the invention, forming each of the second active device arrays includes the following steps. First, a gate and an electrode of the storage capacitor are formed on the first insulating layer. Thereafter, a gate insulating layer is formed on the first insulating layer to cover the gate and the electrode of the storage capacitor. Next, an active layer is formed on the gate insulating layer above the gate. Thereafter, a patterned metal layer is formed above the active layer and the electrode of the storage capacitor, so as to form a source, a drain, and another electrode disposed above the electrode of the storage capacitor. Next, a passivation layer is formed on the first insulating layer to cover the source, the drain, and the other electrode of the storage capacitor, in which the passivation layer has a plurality of openings to respectively expose a portion of the drain and the other electrode. Thereafter, a transparent conductive material is formed on the passivation layer, so as to form the transparent electrode, in which the transparent electrode is electrically connected to the drain and the other electrode of the storage capacitor via the openings, respectively. In one embodiment of the invention, while forming the gate, a gate line is formed concurrently, and while forming the source, a source line is formed concurrently. The gate line is electrically connected to the gate, the source line is electrically connected to the source, and the gate line and the source line are respectively extended to the first substrate via the first through holes.

In one embodiment of the invention, forming each of the third active device arrays includes the following steps. First, a gate and an electrode of the storage capacitor are formed on the second insulating layer. Thereafter, a gate insulating layer is formed on the second insulating layer to cover the gate and the electrode of the storage capacitor. Next, an active layer is formed on the gate insulating layer above the gate. Thereafter, a patterned metal layer is formed above the active layer and the electrode of the storage capacitor, so as to form a source, a drain, and another electrode disposed above the electrode of the storage capacitor. Next, a passivation layer is formed on the second insulating layer to cover the source, the drain, and the other electrode of the storage capacitor, in which the passivation layer has a plurality of openings to respectively expose a portion of the drain and the other electrode. Thereafter, a transparent conductive material is formed on the passivation layer, so as to form the transparent electrode, in which the transparent electrode is electrically connected to the drain and the other electrode of the storage capacitor via the openings, respectively. In one embodiment of the invention, while forming the gate, a gate line is formed concurrently, and while forming the source, a source line is formed concurrently. The gate line is electrically connected to the gate, the source line is electrically connected to the source, and the gate line and the source line are respectively extended to the first substrate via the second through holes.

In one embodiment of the invention, the 3D grid controllable liquid crystal lens further includes forming a sealant in a periphery of the first substrate or the second substrate. The sealant is disposed between the first substrate and the second substrate, so that the first substrate can be assembled with the second substrate.

In one embodiment of the invention, the manufacturing method of the 3D grid controllable liquid lens further includes respectively forming an alignment layer on the transparent electrode of the first active device arrays, forming an alignment layer on the transparent electrode of the second active device arrays, forming an alignment layer on the transparent electrode of the third active device arrays, and forming an alignment layer on the common electrode, so as to perform an alignment process on the above-described liquid crystal layers, respectively.

Another aspect of the invention provides a 3D grid controllable liquid crystal lens, including a first substrate, a plurality of first active device arrays, a first insulating layer, a plurality of first spacers, a plurality of second active device arrays, a second substrate, a plurality of second spacers, and a plurality of liquid crystal layers. The first active device arrays are disposed on the first substrate, and each of the first active device arrays includes a thin film transistor, a storage capacitor, and a transparent electrode electrically connected to the thin film transistor. The first insulating layer is disposed on the first active device arrays. The first spacers are disposed on the first substrate and support the first insulating layer, so as to form a first containing space between the first insulating layer and the first active device arrays. The second active device arrays are disposed on the first insulating layer, and each of the second active device arrays includes a thin film transistor, a storage capacitor, and a transparent electrode electrically connected to the thin film transistor. The second substrate includes an electrode layer disposed thereon, and the electrode layer is arranged opposite to the first substrate. Moreover, the electrode layer is arranged between the second substrate and the second active device arrays. The second spacers are disposed on the first insulating layer and support the second substrate, so that a second containing space is formed between the second substrate and the second active device arrays. The liquid crystal layers are respectively disposed in the first containing space and the second containing space.

In summary, the plurality of active device arrays in the 3D grid controllable liquid crystal lens provided by the invention embodied herein adopt a 3D stacking structure design. That is, by using a structure of stacking at least two layers of active device arrays on a first substrate, and disposing a plurality of corresponding liquid crystal layers on the active device arrays, the 3D grid controllable liquid crystal lens can control the orientation of the liquid crystal molecules in each liquid crystal layer by suitably controlling the driving voltage applied to each active device array. Consequently, a refractive index distribution approaching the GRIN lens is internally generated in the 3D grid controllable liquid crystal lens. Moreover, a focusing function similar to a convex/concave lens focusing/dispersing light can be achieved. Moreover, the invention embodied herein provides a manufacturing method of the above-described 3D grid controllable liquid crystal optical lens.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A-3K are partial schematic cross-sectional diagrams illustrating the steps to manufacture the 3D grid controllable liquid crystal lens depicted in FIG. 1B.

DESCRIPTION OF EMBODIMENTS

Figure 1A:
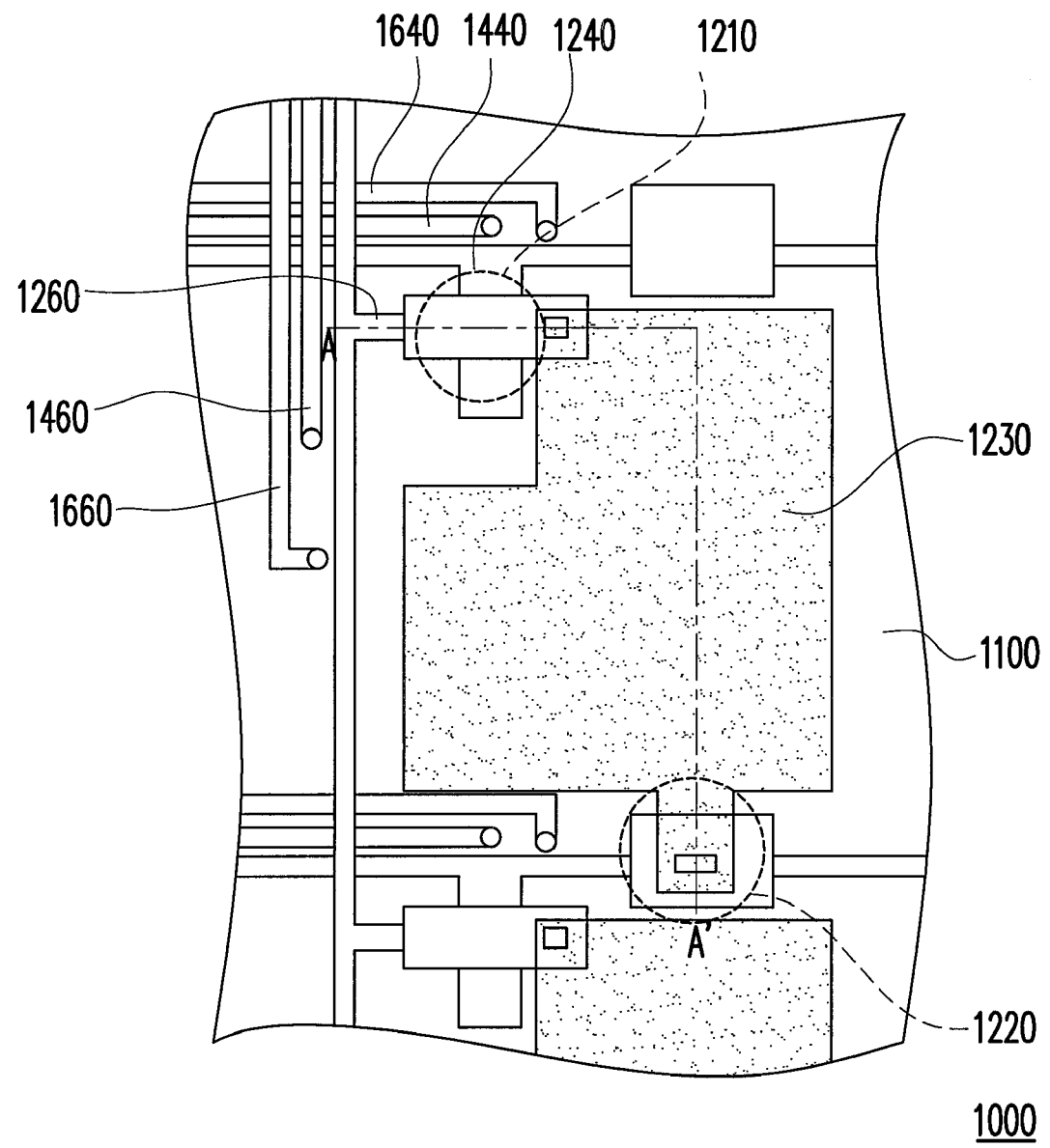
FIG. 1A is a partial top view illustrating a portion of a three-dimensional (3D) grid controllable liquid crystal lens in accordance with an embodiment of the invention.
Figure 1B:
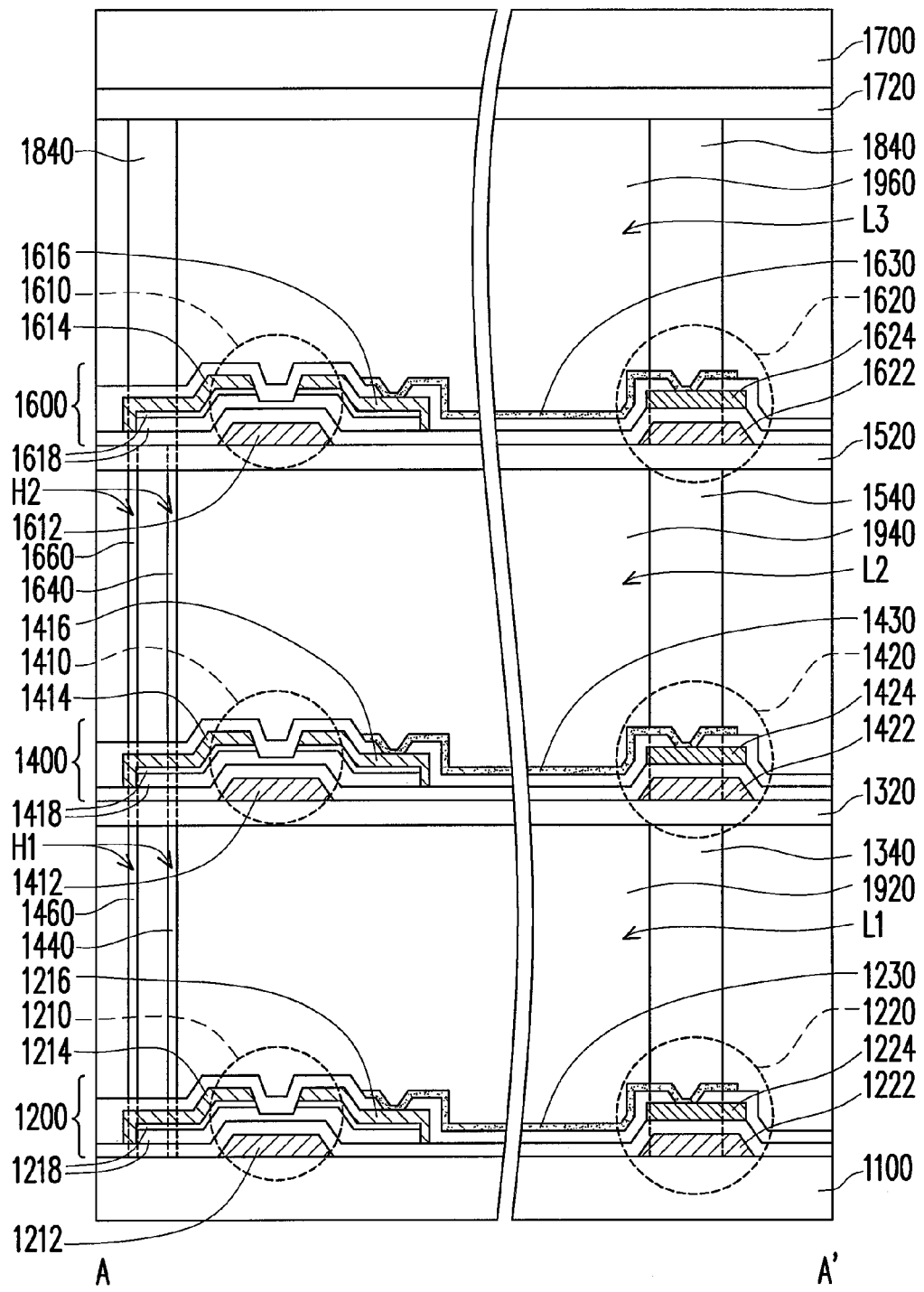
FIG. 1B is a partial cross-sectional view of the 3D grid controllable liquid crystal lens along a line AA' depicted in FIG. 1A.
Figure 1C:
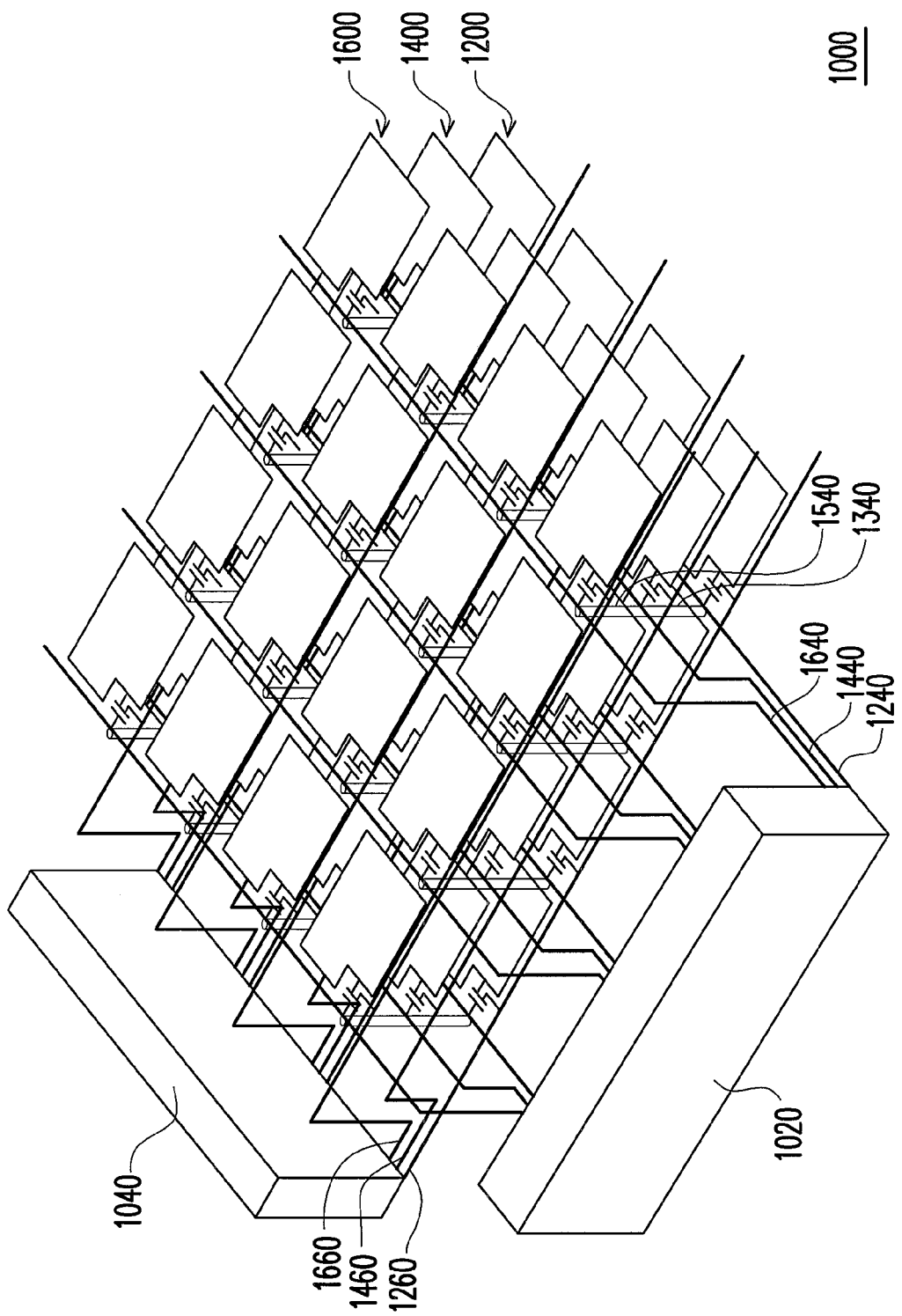
FIG. 1C is a schematic circuit diagram of a 3D grid controllable liquid crystal lens in accordance with an embodiment of the invention.

FIG. 1A is a partial top view illustrating a portion of a three-dimensional (3D) grid controllable liquid crystal lens in accordance with an embodiment of the invention. FIG. 1B is a partial cross-sectional view of the 3D grid controllable liquid crystal lens along a line AA' depicted in FIG. 1A. FIG. 1C is a schematic circuit diagram of a 3D grid controllable liquid crystal lens in accordance with an embodiment of the invention. Referring to FIGS. 1A-1C concurrently, a 3D grid controllable liquid crystal lens 1000 of the present embodiment includes a first substrate 1100, a plurality of first active device arrays 1200, a first insulating layer 1320, a plurality of first spacers 1340, a plurality of second active device arrays 1400, a second insulating layer 1520, a plurality of second spacers 1540, a plurality of third active device arrays 1600, a second substrate 1700, a plurality of third spacers 1840, and a plurality of liquid crystal layers 1920, 1940, and 1960. In the present embodiment of the invention, the first substrate 1100 is a transparent substrate such as a glass substrate, for example.

As shown in FIGS. 1B and 1C, the first active device arrays are disposed on the first substrate 1100, and each of the first active device arrays 1200 includes a thin film transistor 1210, a storage capacitor 1220, and a transparent electrode 1230 electrically connected to the thin film transistor 1210. In the present embodiment of the invention, each thin film transistor 1210 includes a gate 1212, an active layer 1218, a source 1214, and a drain 1216. The drain 1216 is physically connected to the transparent electrode 1230.

Typically speaking, the thin film transistor 1210 is used as a switch for the transparent electrode 1210. That is, when the gate 1212 is being driven, the source 1214 electrically connects to the drain 1216 via the active layer 1218, so that a voltage signal from the source 1214 is transmitted to the drain 1216 and the transparent electrode 1230 in sequence. Moreover, the transparent electrode 1230 is electrically connected to the storage capacitor 1220, so that the storage capacitor 1220 can be charged and discharged. In the present embodiment of the invention, an electrode 1222 of the storage capacitor 1220 and the gate 1212 belong to a same film, and another electrode 1224 of the storage capacitor 1220 and the source 1214 or the drain 1216 belong to a same film.

As shown in FIG. 1B, the first insulating layer 1320 is disposed above the first active device arrays 1200, and the first spacers 1340 are disposed on the first substrate 1100 and support the first insulating layer 1320, so that a first containing space L1 is formed between the first insulating layer 1320 and the first active device arrays 1200. The second active device arrays 1400 are disposed on the first insulating layer 1320, and each of the second active device arrays 1400 includes a thin film transistor 1410, a storage capacitor 1420, and a transparent electrode 1430 electrically connected to the thin film transistor 1410.

In the present embodiment of the invention, the first insulating layer 1320 is mainly used as a substrate for the second active device arrays 1400. The first insulating layer 1320 is composed of $SiO_2$, for example. In one embodiment of the invention, in order to simplify a fabrication process, the first spacers 1340 can be composed of a metallic material. The specifics of the first spacers 1340 are provided in a description of a manufacturing method later in the disclosure. In another embodiment of the invention, the first spacers 1340 can be composed of another suitable material, such as an organic material, an inorganic material, or an insulating material, for example. It should be noted that, the first spacers 1340 depicted in FIG. 1B are disposed on the first substrate 1100 and arranged close to the storage capacitor 1220. The first spacers 1340 are illustrated using a dotted line.

Moreover, as shown in FIGS. 1B and 1C, each of the second active device arrays 1400 includes a thin film transistor 1410, a storage capacitor 1420, and a transparent electrode 1430 electrically connected to the thin film transistor 1410. In the present embodiment of the invention, the thin film transistor 1410 includes a gate 1412, an active layer 1418, a source 1414, and a drain 1416. The drain 1416 is physically connected to the transparent electrode 1430. Similarly, the thin film transistor 1410 is typically used as a switch for the transparent electrode 1430. That is, when the gate 1412 is being driven, the source 1414 electrically connects to the drain 1416 via the active layer 1418, so that a voltage signal from the source 1414 is transmitted to the drain 1416 and the transparent electrode 1430 in sequence. Moreover, the transparent electrode 1430 is electrically connected to the storage capacitor 1420, so that the storage capacitor 1420 can be charged and discharged. Similarly, in the present embodiment of the invention, an electrode 1422 of the storage capacitor 1420 and the gate 1412 belong to a same film, and another electrode 1424 of the storage capacitor 1420 and the source 1414 or the drain 1416 belong to a same film.

As shown in FIG. 1B, the second insulating layer 1520 is disposed above the second active device arrays 1400, and the second spacers 1540 are disposed on the first insulating layer 1320 and support the second insulating layer 1520, so that a second containing space L2 is formed between the second insulating layer 1520 and the second active device arrays 1400. The third active device arrays 1600 are disposed on the second insulating layer 1520, and each of the third active device arrays 1600 includes a thin film transistor 1610, a storage capacitor 1620, and a transparent electrode 1630 electrically connected to the thin film transistor 1610.

In the present embodiment of the invention, the second insulating layer 1520 is mainly used as a substrate for the third active device arrays 1600. The second insulating layer 1520 is composed of $SiO_2$, for example. Similarly, in order to simplify a fabrication process, the second spacers 1540 can be composed of a metallic material. The specifics of the second spacers 1540 are provided in a description of a manufacturing method later in the disclosure. In another embodiment of the invention, the second spacers 1540 can be composed of another suitable material, such as an organic material, an inorganic material, or an insulating material, for example. It should be noted that, the second spacers 1540 depicted in FIG. 1B are disposed on the first insulating layer 1320 and arranged close to the storage capacitor 1420. The second spacers 1540 are illustrated using a dotted line.

Moreover, as shown in FIGS. 1B and 1C, each of the third active device arrays 1600 includes a thin film transistor 1610, a storage capacitor 1620, and a transparent electrode 1630 electrically connected to the thin film transistor 1610. In the present embodiment of the invention, each of the thin film transistor 1610 includes a gate 1612, an active layer 1618, a source 1614, and a drain 1616. The drain 1616 is physically connected to the transparent electrode 1630. Similarly, the thin film transistor 1610 is typically used as a switch for the transparent electrode 1630. That is, when the gate 1612 is being driven, the source 1614 electrically connects to the drain 1616 via the active layer 1618, so that a voltage signal from the source 1614 is transmitted to the drain 1616 and the transparent electrode 1630 in sequence. Moreover, the transparent electrode 1630 is electrically connected to the storage capacitor 1620, so that the storage capacitor 1620 can be charged and discharged. Similarly, in the present embodiment of the invention, an electrode 1622 of the storage capacitor 1620 and the gate 1612 belong to a same film, and another electrode 1624 of the storage capacitor 1620 and the source 1614 or the drain 1616 belong to a same film.

It should be mentioned that, as shown in FIG. 1B, the above-described thin film transistors 1210, 1410, and 1610 are exemplified as bottom-gate thin film transistors. However, in another embodiment that is not illustrated, the above-described thin film transistors may adopt a design using top-gate thin film transistors. In other words, according to a requirement or a design of an user, other suitable thin film transistor structures may be adopted. The invention embodied herein does not specifically restrict a type of the thin film transistors.

Continuing reference to FIGS. 1A-1C, a second substrate 1700 includes a common electrode 1720 disposed thereon and arranged opposite to the first substrate 1100, and the common electrode 1720 is disposed between the second substrate 1700 and the third active device arrays 1600. A plurality of third spacers 1840 are disposed on the second insulating layer 1520 and support the second substrate 1700, so that a third containing space L3 is formed between the second substrate 1700 and the third active device arrays 1600. In the present embodiment of the invention, the second substrate 1700 is a transparent substrate such as a glass substrate, for example. In the present embodiment of the invention, the third spacers 1840 can also be composed of an organic material, an inorganic material, or an insulating material, for example. It should be mentioned that, the third spacers 1840 depicted in FIG. 1B are disposed on the second insulating layer 1520 and arranged close to the storage capacitor 1620. The third spacers 1840 are illustrated using a dotted line.

Moreover, as shown in FIG. 1B, the liquid crystal layers 1920, 1940, and 1960 are respectively disposed in the first containing space L1, the second containing space L2, and the third containing space L3. More specifically, when the first, the second, and the third active device arrays 1200, 1400, and 1600 are being respectively driven, a tilt is produced for a liquid crystal molecule disposed in the first containing space L1, the second containing space L2, and the third containing space L3 due to an electric field effect, whereby an effective refractive index of the entire structure is modified. Therefore, by suitably controlling a driving voltage applied on the first, the second, and the third active device arrays 1200, 1400, and 1600, an refractive index distribution similar to that of a gradient-index (GRIN) lens can be produced internally for the 3D grid controllable liquid crystal lens 1000. Consequently, an adjustable light focus/disperse function similar that of a convex/concave lens can be obtained.

In other words, by mainly controlling a tilt of the liquid crystal molecule in the first containing space L1, the second containing space L2, and the third containing space L3, the 3D grid controllable liquid crystal lens 1000 of the present embodiment internally produces a refractive index distribution approaching the refractive index distribution of a GRID lens. Therefore, the 3D grid controllable liquid crystal lens 1000 has the light focusing function.

In the present embodiment of the invention, as shown in FIGS. 1A and 1C, the first substrate 1100 further includes a plurality of first gate lines 1240, second gate lines 1440, and third gate lines 1640 disposed on thereon, as well as a plurality of first source lines 1260, second source lines 1460, and third source lines 1660 disposed thereon. More specifically, the first gate lines 1240 and the first source lines 1260 are respectively electrically connected to a gate 1212 and a source 1214 of the thin film transistors 1210 of the first active device arrays 1200. The second gate lines 1440 and the second source lines 1460 are respectively electrically connected to a gate 1412 and a source 1414 of the thin film transistors 1410 of the second active device arrays 1400 via a first through hole H1. The third gate lines 1640 and the third source lines 1660 are respectively electrically connected to a gate 1612 and a source 1614 of the thin film transistors 1610 of the third active device arrays 1600 via a second through hole H2.

In other words, by applying driving voltages on the plurality of first, second, and third gate lines 1240, 1440, 1640 on the first substrate 1100, and the plurality of first, second, and third source lines 1260, 1460, and 1660, the first active device arrays 1200 on the first substrate 1100, the second device arrays 1400 on the first insulating layer 1320, and the third active device arrays 1600 disposed on the second insulating layer 1520 can be respectively controlled and driven. Furthermore, a rotational angle of the liquid crystal molecule in the liquid crystal layers 1920, 1940, and 1960 can be controlled, respectively.

In the present embodiment of the invention, as shown in FIG. 1C, the 3D grid controllable liquid crystal lens 1000 further includes a gate controller 1020 and a source controller 1040. The gate controller 1020 is electrically connected to the first, the second, and the third gate lines 1240, 1440, and 1640, respectively. The source controller 1040 is electrically connected to the first, the second, and the third source lines 1260, 1460, and 1660, respectively. In the present embodiment of the invention, the gate controller 1020 is configured to respectively output a scan signal to each of the gates 1212, 1412, and 1612. The source controller 1040 is configured to respectively output a data signal to each of the sources 1214, 1414, and 1614. In one embodiment of the invention, the gate controller 1020 and the source controller 1040 can be integrated on the first substrate 1100. Alternatively, the gate controller 1020 can be externally electrically connected to the first gate lines 1240, the second gate lines 1440, and third gate lines 1640, and the first source lines 1260, the second source lines 1460, and the third source lines 1660. However, the invention should not be construed as being limited to the above examples.

Typically speaking, the 3D grid controllable liquid crystal lens 1000 further includes a sealant (not drawn) in order to bond the first substrate 1100 to the second substrate 1700. The sealant is typically disposed in a periphery of the first substrate 1100 or the second substrate 1700, and the sealant is arranged between the first substrate 1100 and the second substrate 1700. In the present embodiment of the invention, the sealant can be a sealant commonly used for a thin film transistor display panel, or any other suitable sealants.

Figure 2:
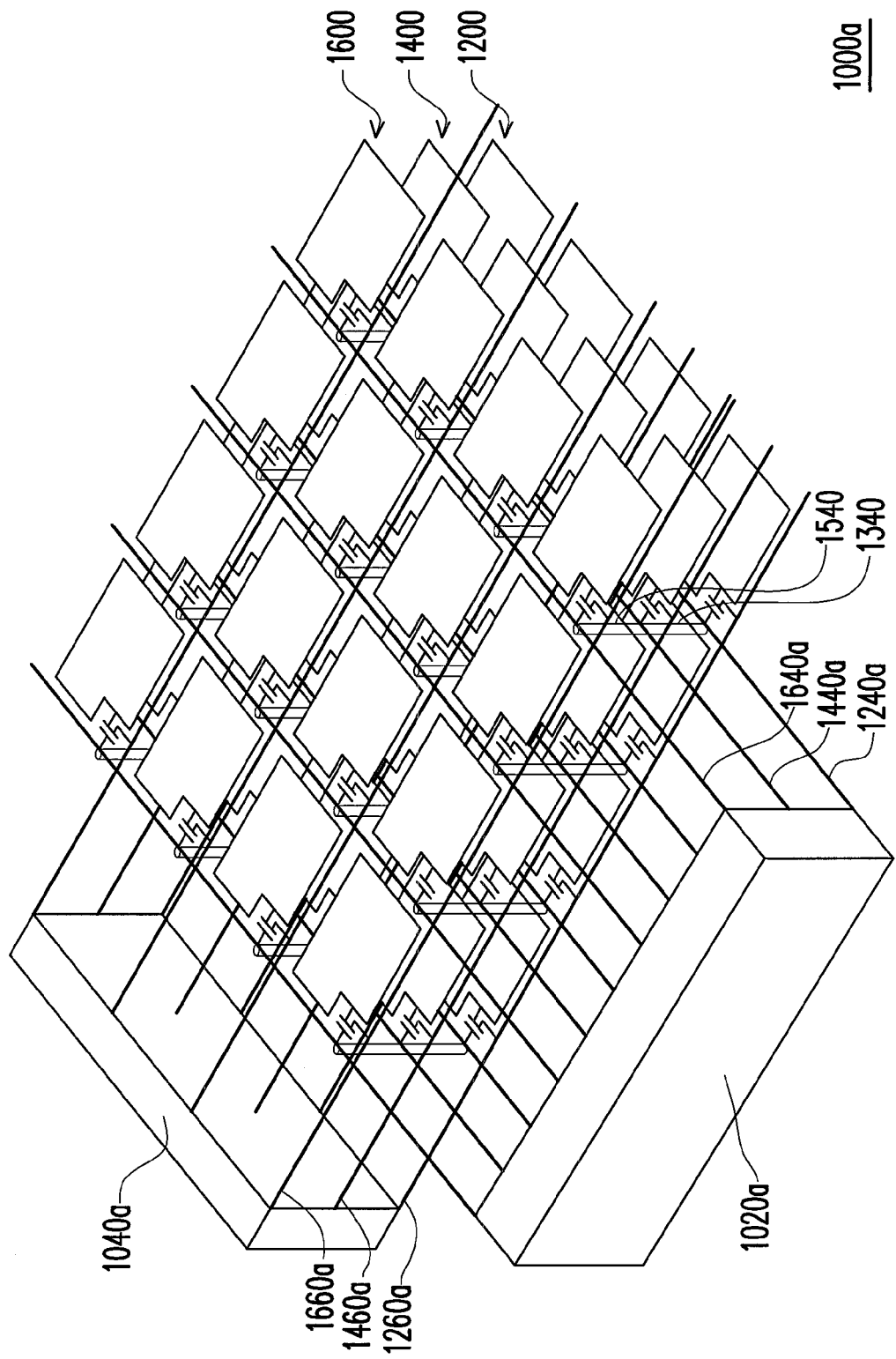
FIG. 2 is a schematic circuit diagram of a 3D grid controllable liquid crystal lens in accordance with another embodiment of the invention.

In another embodiment of the invention, the above-described gate lines and source lines may not adopt a distributed wiring technique, but rather the gate lines and source lines are disposed on the respective film, as shown in a 3D grid controllable liquid crystal lens 1000a depicted in FIG. 2. The 3D grid controllable liquid crystal lens 1000a is similar to the structure of the above-described 3D grid controllable liquid crystal lens 1000, a difference between the two reside in that each of the first active device arrays 1200, the second active device arrays 1400, and the third active device arrays 1600 further includes a gate line 1240a, 1440a, and 1640a, as well as a source line 1260a, 1460a, and 1660a. The gate line 1440a and the source line 1460a are disposed on the first insulating layer 1320, whereas the gate line 1640a and the source line 1660a are disposed on the second insulating layer 1520.

More specifically, on the first substrate 1100, the gate line 1240a and the source line 1260a are interlaced. Moreover, the gate line 1240a and the source line 1260a are respectively electrically connected to the gate 1212 and source 1214 of the thin film transistor 1210. On the first insulating layer 1320, the gate line 1440a and the source line 1460a are interlaced. Moreover, the gate line 1440a and the source line 1460a are respectively electrically connected to the gate 1410 and source 1412 of the thin film transistor 1410. On the second insulating layer 1520, the gate line 1640 and the source line 1660 are interlaced. Moreover, the gate line 1640 and the source line 1660 are respectively electrically connected to the gate 1612 and source 1614 of the thin film transistor 1610.

In FIG. 2, the 3D grid controllable liquid crystal lens 1000a further includes a gate controller 1020a and a source controller 1040a. The gate controller 1020a is electrically connected to the gate lines 1240a, 1440a, and 1640a of the first, the second, and the third active device arrays 1200, 1400, and 1600, respectively. The source controller 1040a is electrically connected to the source lines 1260a, 1460a, and 1660a of the first, the second, and the third active device arrays 1200, 1400, and 1600, respectively. In the present embodiment of the invention, as shown in FIG. 2, since the gate lines 1240a, 1440a, and 1640a belong to different films, and the source lines 1260a, 1460a, and 1660a belong to different films, therefore, the gate controller 1020a and the source controller 1040a can use an alignment process, for example, in order to electrically connect the gate lines 1240a, 1440a, and 1640a to the source lines 1260a, 1460a, and 1660a.

Moreover, in the 3D grid controllable liquid crystal lens 1000 and 1000a, an alignment layer (not drawn) is disposed on the transparent electrode 1230 of the first active device arrays 1200, on the transparent electrode 1430 of the second active device arrays 1400, on the transparent electrode 1630 of the third active device arrays 1600, and on the common electrode 1720. Consequently, an alignment process can be performed on the above-described liquid crystal layers 1920, 1940, and 1960, respectively.

In light of above-described structure, by mainly stacking a plurality of active device arrays 1200, 1400, and 1600 on the first substrate 1100, and injecting liquid crystal molecules on the active device arrays 1200, 1400, and 1600, a three-dimensional three-layer liquid crystal structure is formed for the 3D grid controllable liquid crystal lens 1000 and 1000a of the present embodiment. Therefore, by driving the active device arrays 1200, 1400, and 1600, a rotational degree of each of the liquid crystal layers can be respectively controlled, so that the internal refractive indices of the 3D grid controllable liquid crystal lenses 1000 and 1000a can approach the refractive index distribution of the GRID lens. A light focus/disperse function similar to a convex/concave lens can thus be obtained. Moreover, the 3D grid controllable liquid crystal lenses 1000 and 1000a achieve an electrically adjustable focusing function.

Furthermore, the invention embodied herein also provides a manufacturing method of the above-described 3D grid controllable liquid crystal lens 1000, and a description of the manufacturing method is provided hereinafter.

Figure 3A:
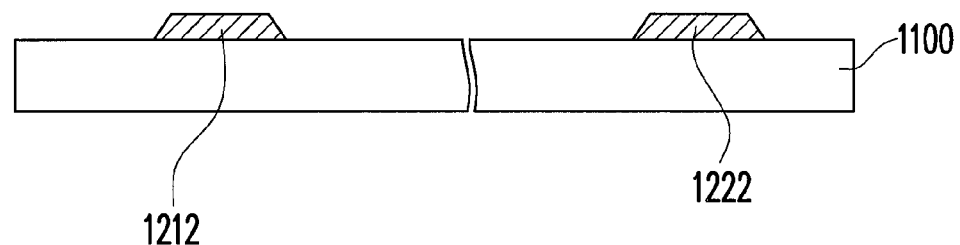

FIGS. 3A-3K are partial schematic cross-sectional diagrams illustrating the steps to manufacture the 3D grid controllable liquid crystal lens depicted in FIG. 1B. Referring to FIG. 3A, first the aforementioned first substrate 1100 is provided. The gate 1212 as well as the electrode 1222 of the storage capacitor 1220 are formed on the first substrate 1100. In the present embodiment of the invention, the gate 1212 and the electrode 1222 are formed by a conventional photolithography process, for example. More specifically, first a conductive material (not drawn) can be formed over the first substrate 1100, and thereafter the photolithography process is used to pattern the conductive material to form the gate 1212 and electrode 1222 depicted in FIG. 3A.

Figure 3B:
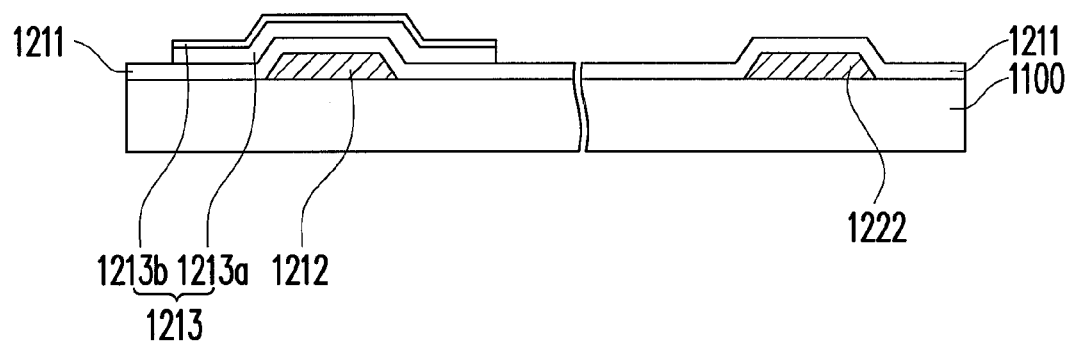

Thereafter, as shown in FIG. 3B, a gate insulating layer 1211 is formed on the first substrate 1100 to cover the gate 1212 and the electrode 1222 of the storage capacitor 1220. In addition, a patterned semiconductor layer 1213 is formed on the gate insulating layer 1211 disposed above the gate 1212. In the present embodiment of the invention, the gate insulating layer 1211 is formed by a chemical vapor deposition process, for example. Typically speaking, the gate insulating layer 1211 is usually composed of silicon oxide. It should be mentioned that, the gate insulating layer 1211 can be composed of other suitable types of insulating materials. Moreover, the patterned semiconductor layer 1213 is formed, for example, by forming a semiconductor material layer (not drawn), and then using the photolithography process to pattern the semiconductor material in order to form the patterned semiconductor layer 1213 depicted in FIG. 3B. In the present embodiment of the invention, as shown in FIG. 3B, the patterned semiconductor layer 1213 includes stacking an amorphous silicon layer 1213a and an N-type doped amorphous silicon layer 1213b.

Figure 3C:
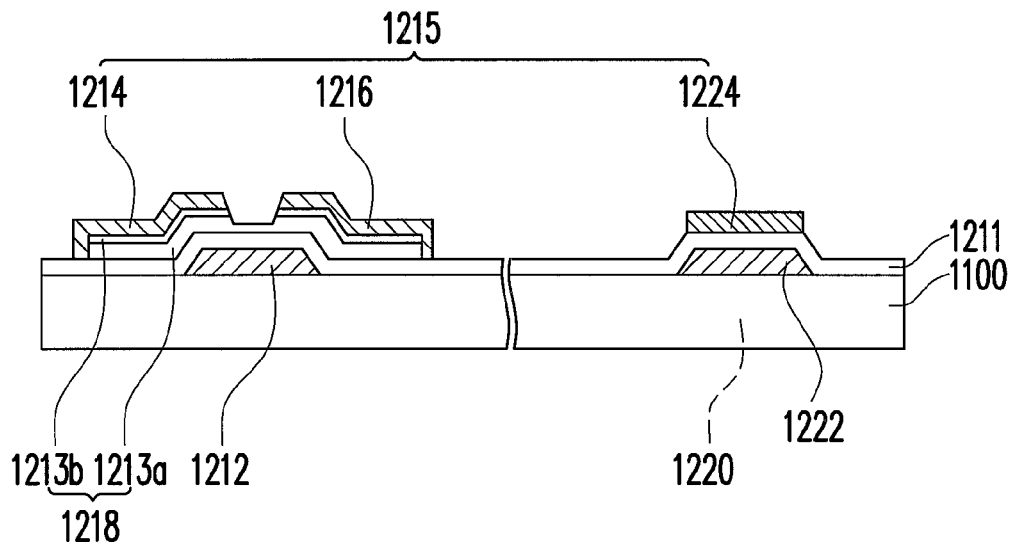

Thereafter, as shown in FIG. 3C, the aforementioned active layer 1218 is formed on the gate insulating layer 1211 disposed above the gate 1212. In addition, as shown in FIG. 3C, a patterned metal layer 1215 is formed above the active layer 1218 and the electrode 1222 of the storage capacitor 1220, so as to form the aforementioned source 1214, the drain 1216, and the other electrode 1224 disposed above the electrode 1222 of the storage capacitor 1220. In the present embodiment of the invention, the active layer 1218 and the patterned metal layer 1215 can be formed concurrently. More specifically, after finishing the step illustrated in FIG. 3B, a metal material layer (not drawn) is formed on the first substrate. Thereafter, the photolithography process is used to concurrently pattern the metal material layer and the patterned semiconductor layer 1213, so as to form the active layer 1218, the source 1214, the drain 1216, and the electrode 1224 depicted in FIG. 3C.

Figure 3D:
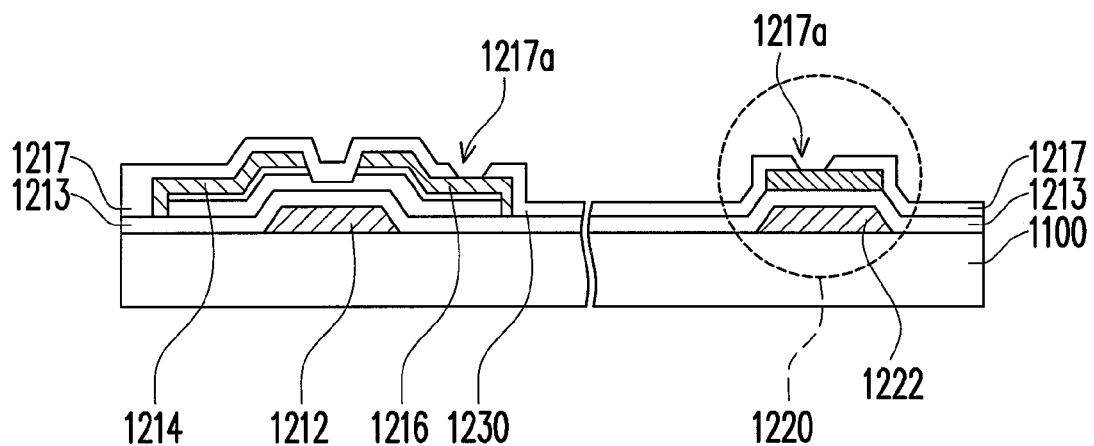

Thereafter, as shown in FIG. 3D, a passivation layer 1217 is formed on the first substrate 1100 to cover the source 1214, the drain 1216, and the other electrode 1224 of the storage capacitor 1220. The passivation layer 1217 has a plurality of openings 1217a to respectively expose a portion of the drain 1216 and the electrode 1224. In the present embodiment of the invention, the passivation layer 1217 is formed, for example, by using the chemical vapor deposition process to deposit a passivation material layer (not drawn) over the first substrate 1100, and then using the photolithography process to pattern the passivation material layer, so as to form the passivation layer 1217 depicted in FIG. 3D.

Figure 3E:
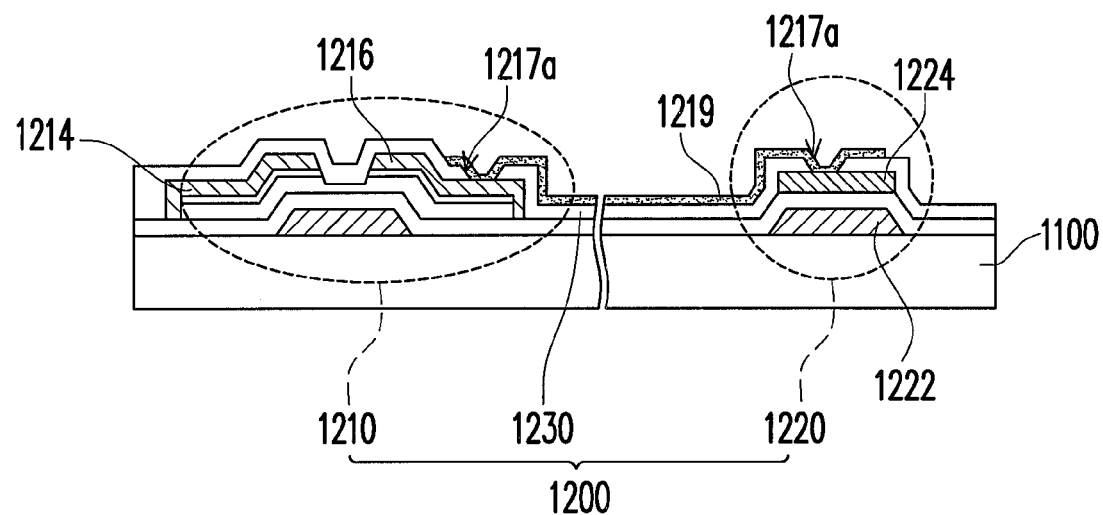

Thereafter, as shown in FIG. 3E, a transparent conductive material 1219 is formed on the passivation layer 1217, so as to form the above-described transparent electrode 1230. The transparent electrode 1230 is electrically connected to the drain 1216 and the electrode 1224 of the storage capacitor 1220, respectively. In the present embodiment of the invention, the transparent conductive material 1219 is formed by the chemical vapor deposition process, for example, or any other suitable fabrication processes. Thereafter, the transparent conductive material 1219 is patterned to form the transparent electrode 1230 depicted in FIG. 3E. Up to this point, the steps for manufacturing the aforementioned first active device arrays 1200 on the first substrate 1100 are substantially complete.

Figure 3F:
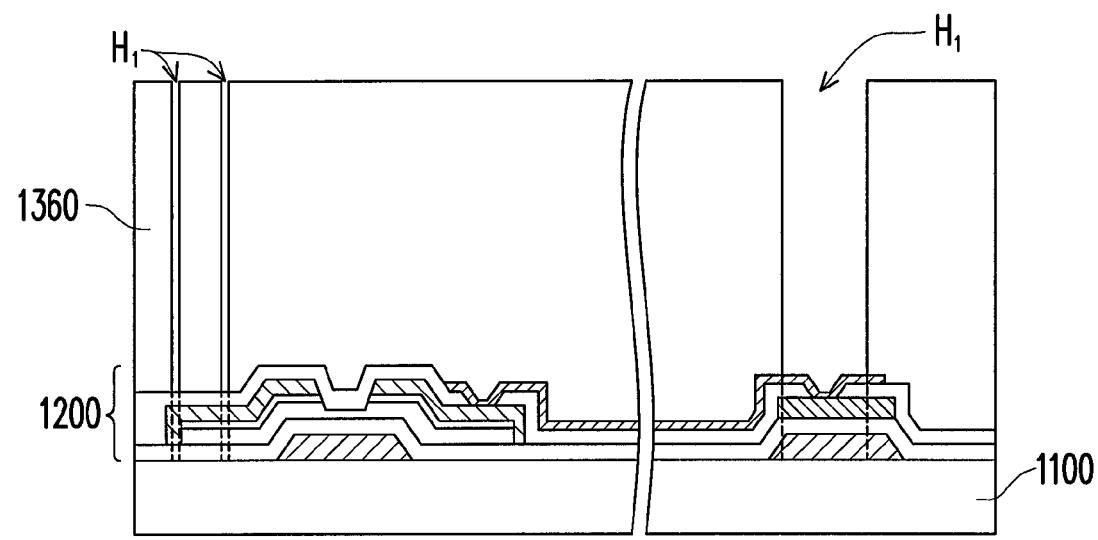

Thereafter, as shown in FIG. 3F, a first dielectric layer 1360 is formed on the first substrate 1100, so as to cover the completed first active device arrays 1200. Moreover, the first dielectric layer 1360 is patterned to form the aforementioned first through holes H1 exposing the first substrate 1100. In the present embodiment of the invention, the first dielectric layer 1360 is composed of a low-k dielectric material, for example. Moreover, the first dielectric layer 1360 is formed by using a spin coating process, for example. The first dielectric layer 1360 is patterned by an exposure and development process, for example, so as to form the first through holes H1 depicted in FIG. 3F.

Figure 3G:
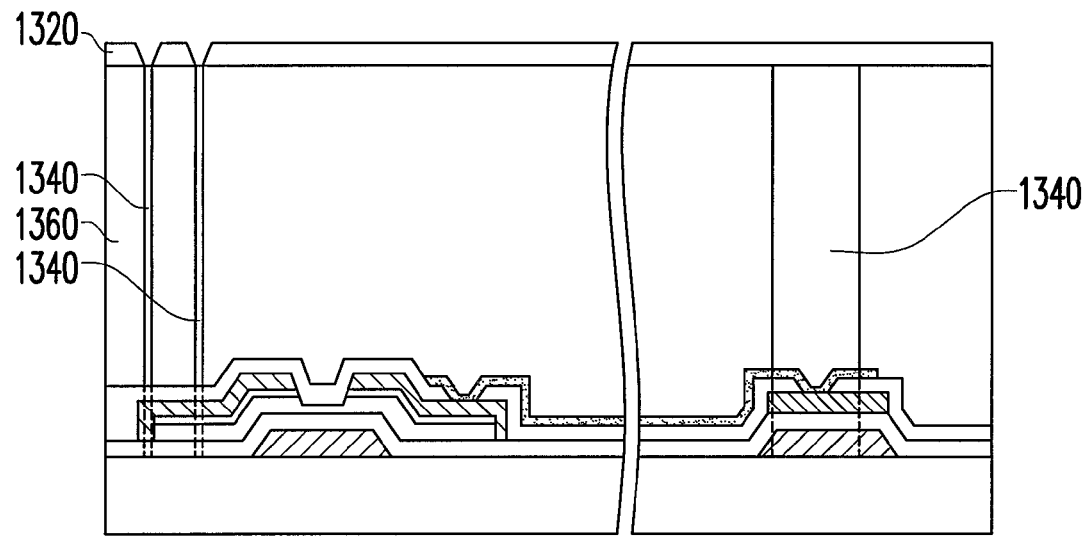

Thereafter, as shown in FIG. 3G, a first spacer material (not drawn) is injected into the first through holes H1, so as to form the aforementioned plurality of first spacers 1340 on the first substrate 1100. In the present embodiment of the invention, the first spacers 1340 can be composed of a metallic material, an organic material, or an inorganic material. Moreover, the first spacers 1340 is mainly used to support the aforementioned first insulating layer 1320 formed by subsequent processes. In an un-illustrated embodiment of the invention, if a plurality of the aforementioned first, second, and third gate lines 1240, 1440, and 1640, and a plurality of the aforementioned first, second, and third source lines 1260, 1460, and 1660 are formed on the first substrate 1100, then a portion of the first spacers 1340 is electrically connected to the second gate lines 1440 and the second source lines 1460, respectively, in order to electrically bridge the second active device arrays 1400 disposed on the first insulating layer 1320. At this time, the first spacers 1340 is composed of a metallic material, for example.

Continuing reference to FIG. 3G, after completing the aforementioned steps, the above-described first insulating layer 1320 is formed on the first dielectric layer 1360, and the first insulating layer 1320 is patterned to expose the portion of the first spacers 1340 electrically connected to the second gate lines 1440 and the second source lines 1460. Here, at least a portion of the first spacers 1340 supports the first insulating layer 1320. As shown in an embodiment of the invention illustrated in FIG. 2, the first insulating layer 1320 can also be unpatterned. That is, the gate lines and the source lines disposed on the first insulating layer 1320 are not wired onto the first substrate 1100. Since reference can be found in the previously mentioned FIG. 2 and the description thereof, further details are omitted hereafter. Moreover, the first insulating layer 1320 is composed of silicon oxide (SiO$_2$), and the first insulating layer 1320 is formed by the chemical vapor deposition process, for example.

Figure 3H:
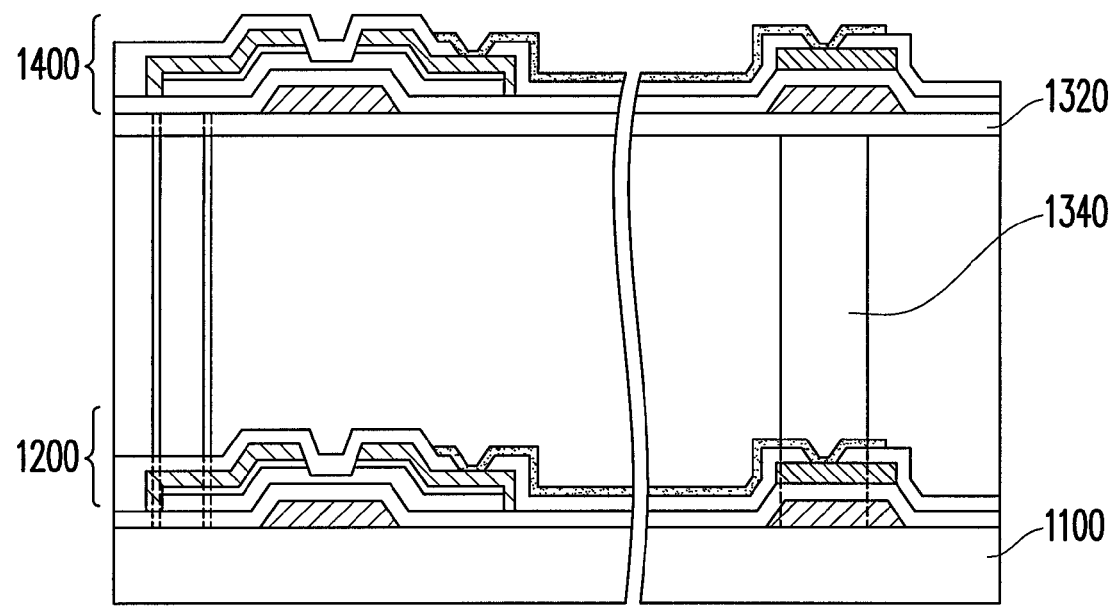
Figure 31:
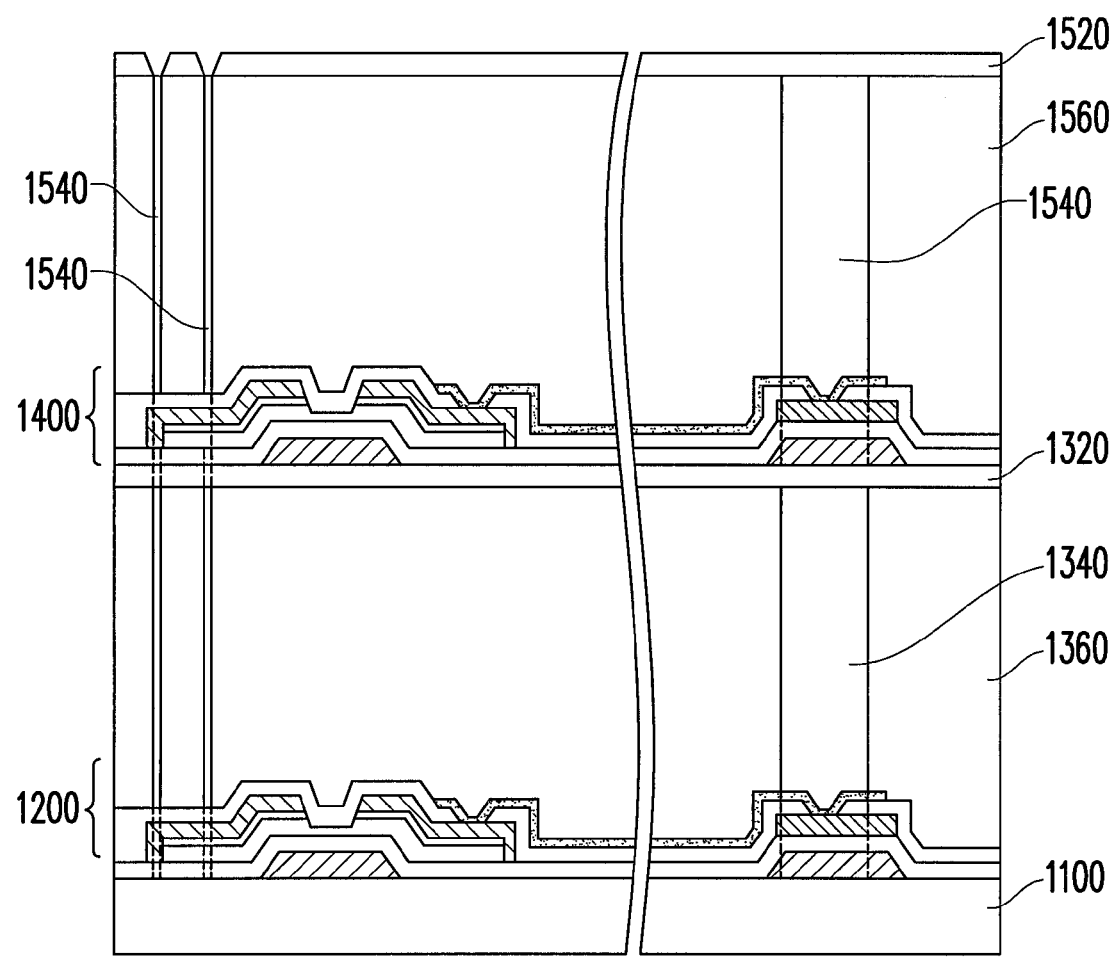

Thereafter, as shown in FIG. 3H, the manufacturing method illustrated in the aforementioned FIGS. 3A-3E is repeated, and a plurality of the aforementioned second active device arrays 1400 are formed on the first insulating layer 1320. By reference to the manufacturing method illustrated in FIGS. 3A-3E, persons having ordinary knowledge in the art can surely comprehend a forming method of the second active device arrays 1400. Therefore, details of the fabrication processes thereof are omitted hereafter.

As shown in FIG. 3I, after the steps for forming the second active device arrays 1400 on the first insulating layer 1320 are completed, the method illustrated from FIGS. 3F to 3G is used to form a second dielectric layer 1560 on the first insulating layer 1320, so as to cover the second active device arrays 1400. Moreover, the aforementioned second spacers 1540 and the second insulating layer 1520 are formed, in which the second insulating layer 1520 is supported by a portion of the second spacers 1540. By reference to the manufacturing method illustrated in FIGS. 3F to 3G, persons having ordinary knowledge in the art can surely comprehend a forming method of the second dielectric layer 1560, the second spacers 1540, and the second insulating layer. Therefore, details of the fabrication processes thereof are omitted hereafter. In one embodiment of the invention, a portion of the second spacers 1540 can be electrically connected to the third gate lines 1640 and the third source lines 1660, respectively, in order to electrically bridge the third active device arrays 1600, formed in the subsequent steps and disposed on the second insulating layer 1520. At this time, the second spacers 1540 is composed of a metallic material.

Figure 3J:
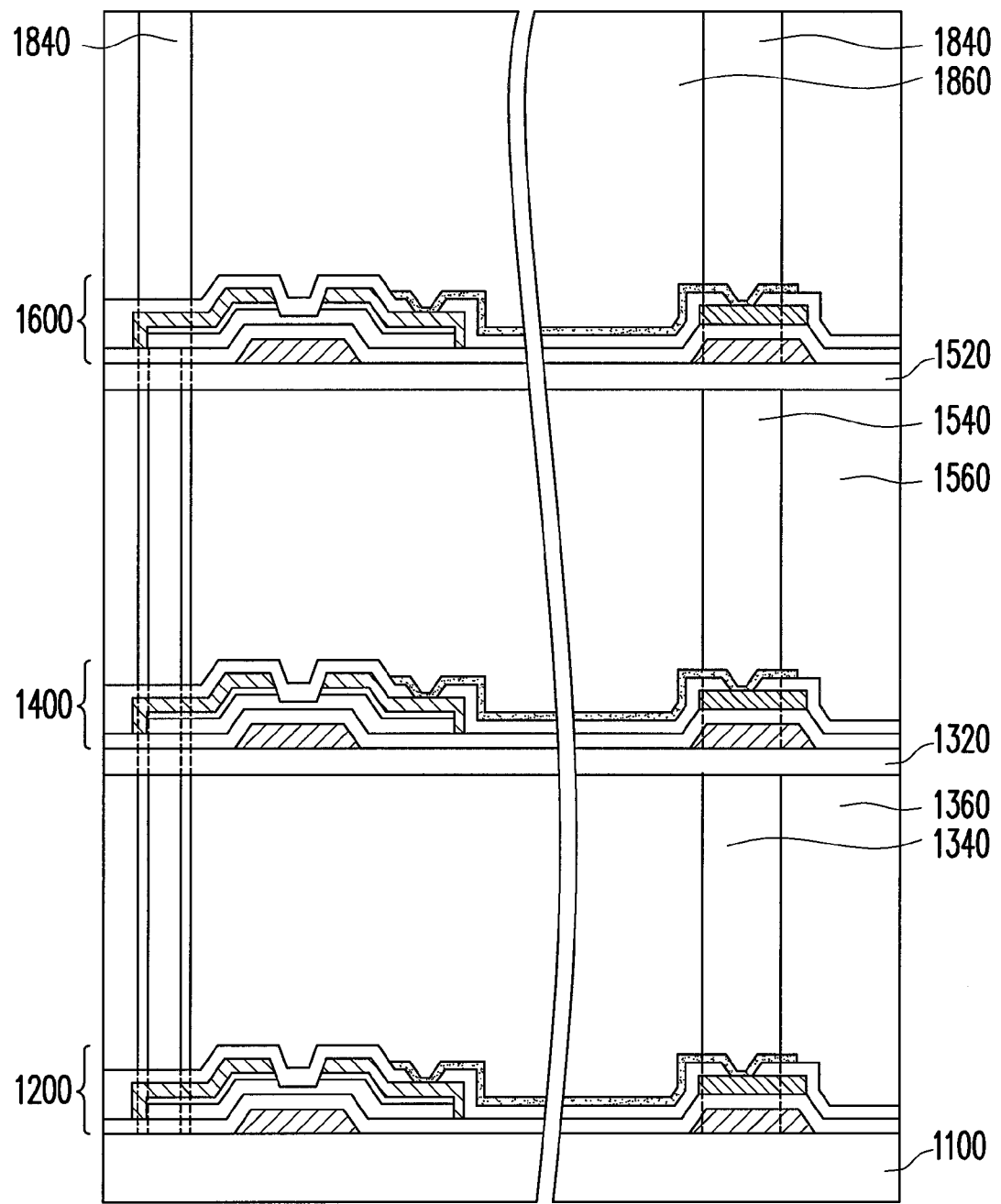

Thereafter, as shown in FIG. 3J, the manufacturing method illustrated in FIGS. 3A-3G is repeated in sequence. Similarly, a plurality of the aforementioned third active device arrays 1600, a third dielectric layer 1860 covering the third active device arrays 1600, and a plurality of the aforementioned third spacers 1840 are formed on the second insulating layer 1520. By reference to the manufacturing method illustrated in FIGS. 3A-3G, persons having ordinary knowledge in the art can surely comprehend a forming method of the third active device arrays 1600, the third dielectric layer 1860, and the third spacers 1840. Therefore, details of the fabrication processes thereof are omitted hereafter.

Figure 3K:
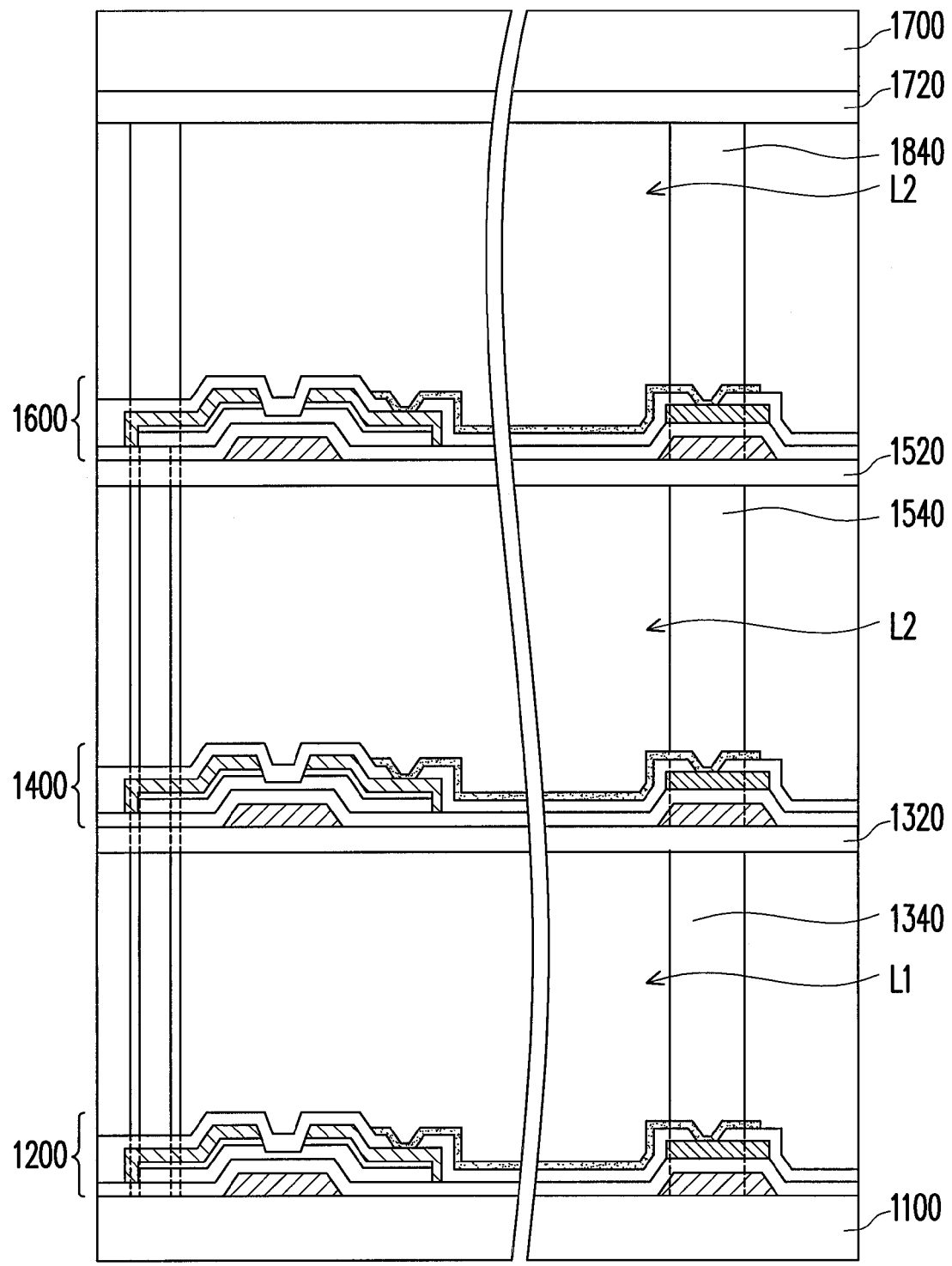

Next, as shown in FIG. 3K, the first substrate 1100 with the above-described steps completed is assembled with the second substrate 1700. Moreover, the aforementioned first dielectric layer 1360, the second dielectric layer 1560, and the third dielectric layer 1860 are removed, so as to respectively form the aforementioned first containing space L1 between the first insulating layer 1320 and the first active device arrays 1200, the second containing space L2 between the second insulating layer 1520 and the second active device arrays 1400, and the third containing space L3 between the second substrate 1700 and the third active device arrays 1600. In the present embodiment of the invention, the dielectric layers 1360, 1560, and 1860 can be concurrently removed by using a cleaning process. Moreover, the first substrate 1100 can be assembled with the second substrate 1700 by using an adhesive (not drawn), and disposing the adhesive on at least one of the peripheries of the first substrate 1100 and the second substrate 1700, aligning and bonding the substrates 1100 and 1700, and thereafter forming the aforementioned sealant when the adhesive solidifies. In the present embodiment of the invention, the sealant can be formed by performing a plastic framing process suitable for packaging a liquid crystal display panel, or the sealant can be formed by any other suitable plastic framing techniques and materials.

Thereafter, a liquid crystal material (not drawn) is injected between the first substrate 1100 and the second substrate 1700, so as to form a plurality of the aforementioned liquid crystal layers 1920, 1940, and 1960, as shown in FIG. 1B. The liquid crystal layers 1920, 1940, and 1960 are respectively disposed in the first containing space L1, the second containing space L2, and the third containing space L3. In the present embodiment of the invention, the liquid crystal layers 1920, 1940, and 1960 can be formed by performing a vacuum suction process or a one drop filling (ODF) process. Up to this point, the manufacturing of the 3D grid controllable liquid crystal lens 1000 depicted in FIG. 1B is substantially complete.

It should be noted that, while performing the steps to form the aforementioned gates 1212, 1412, and 1612, the corresponding gate lines (not drawn) can be concurrently formed. Moreover, while performing the steps to form the aforementioned sources 1214, 1414, and 1614, the corresponding source lines (not drawn) can be concurrently formed. Here, the corresponding gate lines are electrically connected to the gates 1212, 1412, and 1612, whereas the source lines are electrically connected to the sources 1214, 1414, and 1614. In addition, the gate lines and the source lines are interlaced. In one embodiment of the invention, the gate lines and the source lines disposed on the first insulating layer 1320 can be respectively extended to the first substrate 1100 via the aforementioned first through holes H1. In addition, the gate lines and the source lines disposed on the second insulating layer 1520 can be respectively extended to the first substrate via the aforementioned second through holes H2.

Moreover, in one embodiment of the invention, the above-described manufacturing method can further include forming an alignment layer (not drawn), respectively, on the transparent electrode 1230 of the first active device arrays 1200, on the transparent electrode 1430 of the second active device arrays 1400, on the transparent electrode 1630 of the third active device arrays 1600, and on the common electrode 1720. Consequently, an alignment process can be performed on the above-described liquid crystal layers 1920, 1940, and 1960, respectively.

It should be mentioned that, the aforementioned liquid crystal layers 1920, 1940, 1960 can be injected by first performing the ODF process, and thereafter performing an adhesive process to assemble the first substrate 1100 with the second substrate 1700. In other words, the order of the manufacturing method illustrated in FIGS. 3A-3K can be adjusted according to an user's needs, and the invention is not limited to the specifics described by the embodiments.

According to the above-described concepts, the invention embodied herein may also provide a 3D grid controllable liquid crystal lens 2000. Compared to a three level active device array structure adopted by the 3D grid controllable liquid crystal lens 1000, the 3D grid controllable liquid crystal lens 2000 adopts a two level active device array structure, and a description thereof is provided hereafter.

Figure 4:
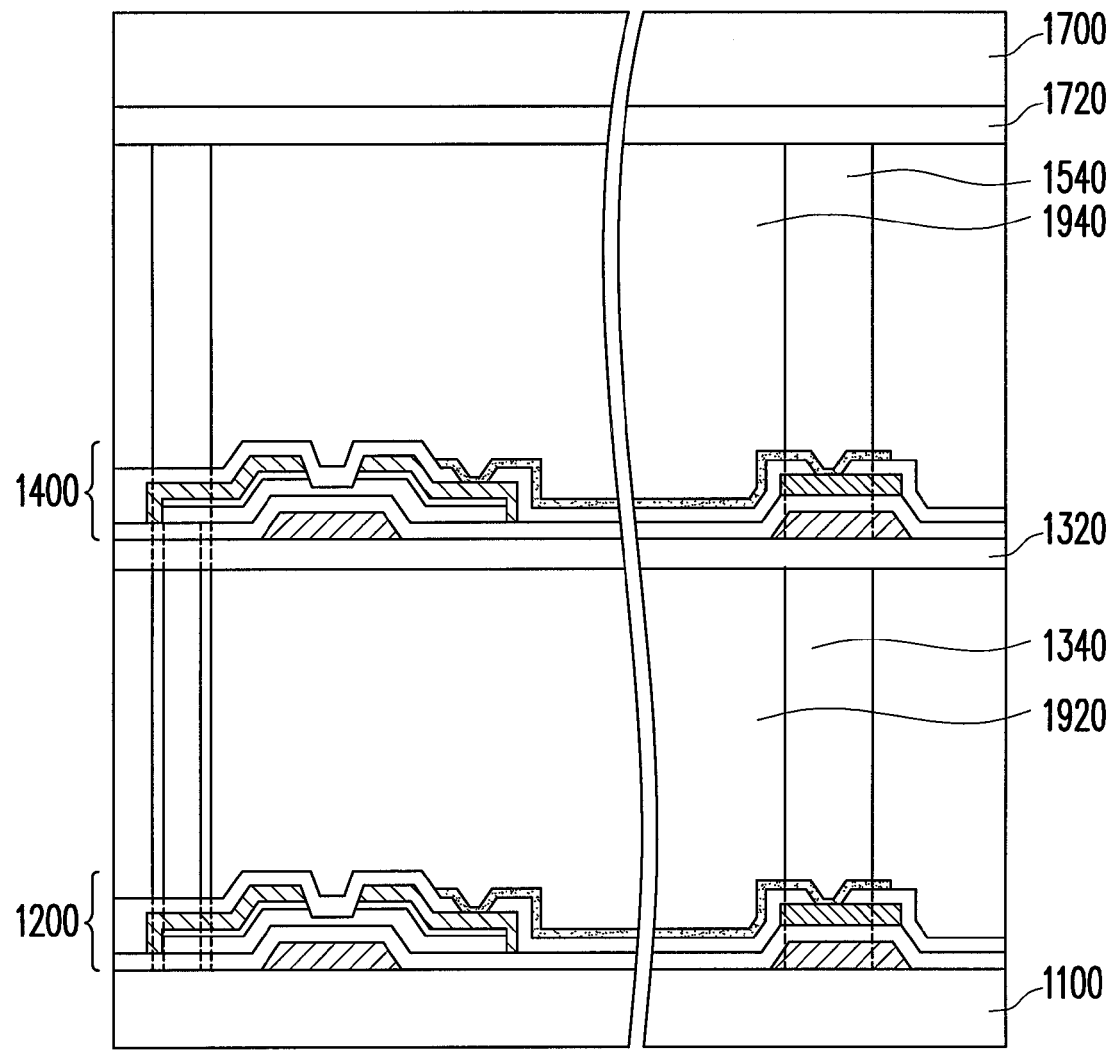
FIG. 4 is a partial top view illustrating a portion of a 3D grid controllable liquid crystal lens in accordance with an embodiment of the invention.

Referring to FIG. 4, the 3D grid controllable liquid crystal lens 2000 includes an aforementioned first substrate 1100, a plurality of the first active device arrays 1200, a first insulating layer 1320, a plurality of first spacers 1340, a plurality of the second active device arrays 1400, a second substrate 1700, a plurality of second spacers 1540, and a plurality of the liquid crystal layers 1920 and 1940. In the present embodiment of the invention, the 3D grid controllable liquid crystal lens 2000 adopts a stacked structure of dual layer active device arrays 1200 and 1400. Since the positioning of the 3D grid controllable liquid crystal lens 2000 is similar to the 3D grid controllable liquid crystal lens 1000, the previous description can be referenced, and therefore further details thereof are omitted hereafter.

By applying a driving voltage to the first active device arrays 1200 disposed on the first substrate 1100, and to the second active device arrays 1400 disposed on the first insulating layer 1320, the effective refractive index distributions of the internal liquid crystal layers 1920 and 1940 of the 3D grid controllable liquid crystal lens 2000 can approach the refractive index distribution of the GRIN lens. Therefore, like the 3D grid controllable liquid crystal lens 1000 previously described, the 3D grid controllable liquid crystal lens 2000 has an optical function such as an electrically adjustable focusing capability.

It should be noted that, regarding the number of the plurality of layers of the active device arrays stacked for the 3D grid controllable liquid crystal lens, the number is not restricted by the aforementioned two layer or three layer structure. In other embodiments of the invention, the number of stacked layers may surpass three layers. Generally speaking, with an increasing number of layers, the resulting refractive index distribution can further approach an ideal GRIN lens, and thereby obtain a preferable optical focusing or an image forming quality. However, it is worth noting that, with the increasing number of layers, the transmittance of the entire structure correspondingly decreases, and the manufacturing cost increases. Therefore, according to the 3D grid controllable liquid crystal lens provided by the invention embodied herein, the number of the stacked layers of the active device arrays reflect the needs of the user, and the number is not limited to the aforementioned two layer or three layer structure.

In light of the foregoing, by mainly using a structure of stacking at least two layers of active device arrays on a first substrate, and disposing a plurality of corresponding liquid crystal layers on the active device arrays, the 3D grid controllable liquid crystal lens, as provided by the invention embodied herein, can control the orientation of the liquid crystal molecules in each liquid crystal layer by suitably controlling the driving voltage applied to each active device array. Consequently, a refractive index distribution approaching the GRIN lens is internally generated in the 3D grid controllable liquid crystal lens. Moreover, a focusing function similar to a convex/concave lens focusing/dispersing light can be achieved. Moreover, the invention embodied herein provides a manufacturing method of the above-described 3D grid controllable liquid crystal optical lens.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A three-dimensional (3D) grid controllable liquid crystal lens, comprising:
   a first substrate;
   a plurality of first active device arrays disposed on the first substrate, each of the first active device arrays comprising a thin film transistor, a storage capacitor, and a transparent electrode electrically connected to the thin film transistor;
   a first insulating layer disposed above the first active device arrays;
   a plurality of first spacers disposed on the first substrate and supporting the first insulating layer, so as to form a first containing space between the first insulating layer and the first active device arrays;

a plurality of second active device arrays disposed on the first insulating layer, each of the second active device arrays comprising a thin film transistor, a storage capacitor, and a transparent electrode electrically connected to the thin film transistor;

a second insulating layer disposed above the second active device arrays;

a plurality of second spacers disposed on the first insulating layer and supporting the second insulating layer, so as to form a second containing space between the second insulating layer and the second active device arrays;

a plurality of third active device arrays disposed on the second insulating layer, each of the third active device arrays comprising a thin film transistor, a storage capacitor, and a transparent electrode electrically connected to the thin film transistor;

a second substrate comprising a common electrode disposed thereon and arranged opposite to the first substrate, and the common electrode is located between the second substrate and the third active device arrays;

a plurality of third spacers disposed on the second insulating layer and supporting the second substrate, so as to form a third containing space between the second substrate and the third active device arrays; and a plurality of liquid crystal layers respectively disposed in the first containing space, the second containing space, and the third containing space.

2. The 3D grid controllable liquid crystal lens as claimed in claim 1, wherein each of the first active device arrays, the second active device arrays, and the third active device arrays further comprises a gate line and a source line, the gate line and the source line are interlaced, the gate line is electrically connected to a gate of the thin film transistor, and the source line electrically connected to a source of the thin film transistor.

3. The 3D grid controllable liquid crystal lens as claimed in claim 2, further comprising a gate controller and a source controller, wherein the gate controller is electrically connected to the gate line of the first active device arrays, the second active device arrays, and the third active device arrays, respectively, and the source controller is electrically connected to the source line of the first, the second, and the third active device arrays, respectively.

4. The 3D grid controllable liquid crystal lens as claimed in claim 1, wherein a plurality of first gate lines, second gate lines, and third gate lines and a plurality of first gate lines, second gate lines, and third source lines are disposed on the first substrate, wherein the first gate lines and the first source lines are respectively electrically connected to a gate and a source of the thin film transistors of the first active device arrays, the second gate lines and the second source lines are respectively electrically connected to a gate and a source of the thin film transistors of the second active device arrays via a first through hole, and the third gate lines and the third source lines are respectively electrically connected to a gate and a source of the thin film transistors of the third active device arrays via a second through hole.

5. The 3D grid controllable liquid crystal lens as claimed in claim 4, further comprising a gate controller and a source controller, wherein the gate controller is electrically connected to the first gate lines, the second gate lines, and third gate lines, respectively, and the source controller is electrically connected to the first gate lines, the second gate lines, and the third source lines, respectively.

6. The 3D grid controllable liquid crystal lens as claimed in claim 1, wherein each of the thin film transistors of the first active device arrays, the second active device arrays, and the third active device arrays comprises at least a gate, an active layer, a source, and a drain, the drain is physically connected to the transparent electrode, and when the gate is being driven, the source electrically connects to the drain via the active layer.

7. The 3D grid controllable liquid crystal lens as claimed in claim 6, wherein an electrode of each of the storage capacitors and the gate belong to a same film, and another electrode of each of the storage capacitors and the source or the drain belong to a same film.

8. The 3D grid controllable liquid crystal lens as claimed in claim 1, further comprising a sealant disposed in a periphery of the first substrate or the second substrate, and arranged between the first substrate and the second substrate.

9. The 3D grid controllable liquid crystal lens as claimed in claim 1, wherein the first substrate and the second substrate are transparent substrates.

10. The 3D grid controllable liquid crystal lens as claimed in claim 1, wherein a material of the first spacers and the second spacers comprises metal.

11. The 3D grid controllable liquid crystal lens as claimed in claim 1, wherein an alignment layer is disposed on the transparent electrode of the first active device arrays, an alignment layer is disposed on the transparent electrode of the second active device arrays, an alignment layer is disposed on the transparent electrode of the third active device arrays, and an alignment layer is disposed on the common electrode, so as to perform an alignment process on the liquid crystal layers.

12. A manufacturing method of a three-dimensional (3D) grid controllable liquid crystal lens, comprising:

providing a first substrate;

forming a plurality of first active device arrays on the first substrate, wherein each of the first active device arrays comprises a thin film transistor, a storage capacitor, and a transparent electrode electrically connected to the thin film transistor;

forming a first dielectric layer on the first substrate to cover the first active device arrays;

patterning the first dielectric layer to form a plurality of first through holes exposing the first substrate;

injecting a first spacer material into the first through holes, so as to form a plurality of first spacers on the first substrate;

forming a first insulating layer on the first dielectric layer, wherein the first spacers support the first insulating layer;

forming a plurality of second active device arrays on the first insulating layer, wherein each of the second active device arrays comprises a thin film transistor, a storage capacitor, and a transparent electrode electrically connected to the thin film transistor;

forming a second dielectric layer on the first insulating layer to cover the second active device arrays;

patterning the second dielectric layer to form a plurality of second through holes exposing the first insulating layer;

injecting a second spacer material into the second through holes, so as to form a plurality of second spacers on the first insulating layer;

forming a second insulating layer on the second dielectric layer, wherein the second spacers support the second insulating layer;

forming a plurality of third active device arrays on the second insulating layer, wherein each of the third active device arrays comprises a thin film transistor, a storage capacitor, and a transparent electrode electrically connected to the thin film transistor;

forming a third dielectric layer on the second insulating layer to cover the third active device arrays;

patterning the third dielectric layer to form a plurality of third through holes exposing the first insulating layer;

injecting a third spacer material into the third through holes, so as to form a plurality of third spacers on the second insulating layer;

assembling the first substrate with a second substrate;

removing the first dielectric layer, the second dielectric layer, and the third dielectric layer, so as to respectively form a first containing space between the first insulating layer and the first active device arrays, a second containing space between the second insulating layer and the second active device arrays, and a third containing space between the second substrate and the third active device arrays; and injecting a liquid crystal material between the first substrate and the second substrate, so as to form a plurality of liquid crystal layers, wherein the liquid crystal layers are respectively disposed in the first containing space, the second containing space, and the third containing space, a common electrode is disposed on the second substrate, and the common electrode is arranged between the second substrate and the third active device arrays.

13. The manufacturing method as claimed in claim 12, wherein forming each of the first active device arrays comprises:

forming a gate and an electrode of the storage capacitor on the first substrate;

forming a gate insulating layer on the first substrate to cover the gate and the electrode of the storage capacitor;

forming an active layer on the gate insulating layer above the gate;

forming a patterned metal layer above the active layer and the electrode of the storage capacitor, so as to form a source, a drain, and another electrode disposed above the electrode of the storage capacitor;

forming a passivation layer on the first substrate to cover the source, the drain, and the other electrode of the storage capacitor, wherein the passivation layer has a plurality of openings to respectively expose a portion of the drain and the other electrode; and forming a transparent conductive material on the passivation layer, so as to form the transparent electrode, wherein the transparent electrode is electrically connected to the drain and the other electrode of the storage capacitor via the openings, respectively.

14. The manufacturing method as claimed in claim 13, wherein while forming the gate a gate line is formed concurrently, while forming the source a source line is formed concurrently, the gate line electrically connects to the gate, the source line electrically connects to the source, and the gate line and the source line are interlaced.

15. The manufacturing method as claimed in claim 12, wherein forming each of the second active device arrays comprises:

forming a gate and an electrode of the storage capacitor on the first insulating layer;

forming a gate insulating layer on the first insulating layer to cover the gate and the electrode of the storage capacitor;

forming an active layer on the gate insulating layer above the gate;

forming a patterned metal layer above the active layer and the electrode of the storage capacitor, so as to form a source, a drain, and another electrode disposed above the electrode of the storage capacitor;

forming a passivation layer on the first insulating layer to cover the source, the drain, and the other electrode of the storage capacitor, wherein the passivation layer has a plurality of openings to respectively expose a portion of the drain and the other electrode; and forming a transparent conductive material on the passivation layer, so as to form the transparent electrode, wherein the transparent electrode is electrically connected to the drain and the other electrode of the storage capacitor via the openings, respectively.

16. The manufacturing method as claimed in claim 15, wherein while forming the gate a gate line is formed concurrently, while forming the source a source line is formed concurrently, the gate line electrically connects to the gate, the source line electrically connects to the source, and the gate line and the source line are respectively extended to the first substrate via a portion of the first through holes.

17. The manufacturing method as claimed in claim 12, wherein forming each of the third active device arrays comprises:

forming a gate and an electrode of the storage capacitor on the second insulating layer;

forming a gate insulating layer on the second insulating layer to cover the gate and the electrode of the storage capacitor;

forming an active layer on the gate insulating layer above the gate;

forming a patterned metal layer above the active layer and the electrode of the storage capacitor, so as to form a source, a drain, and another electrode disposed above the electrode of the storage capacitor;

forming a passivation layer on the second insulating layer to cover the source, the drain, and the other electrode of the storage capacitor, wherein the passivation layer has a plurality of openings to respectively expose a portion of the drain and the other electrode; and forming a transparent conductive material on the passivation layer, so as to form the transparent electrode, wherein the transparent electrode is electrically connected to the drain and the other electrode of the storage capacitor via the openings, respectively.

18. The manufacturing method as claimed in claim 17, wherein a gate line is formed concurrently while forming the gate, a source line is formed concurrently while forming the source, the gate line electrically connects to the gate, the source line electrically connects to the source, and the gate line and the source line are respectively extended to the first substrate via a portion of the second through holes.

19. The manufacturing method as claimed in claim 12, wherein a material of the first spacers and the second spacers comprises metal.

20. The manufacturing method as claimed in claim 12, further comprising forming a sealant in a periphery of the first substrate or the second substrate, and the sealant is arranged between the first substrate and the second substrate to assemble the first substrate with the second substrate.

21. The manufacturing method as claimed in claim 12, further comprising respectively forming an alignment layer on the transparent electrode of the first active device arrays, forming an alignment layer on the transparent electrode of the second active device arrays, forming an alignment layer on the transparent electrode of the third active device arrays, and forming an alignment layer on the common electrode, so as to perform an alignment process on the liquid crystal layers, respectively.

22. A three-dimensional (3D) grid controllable liquid crystal lens, comprising:
a first substrate;
a plurality of first active device arrays disposed on the first substrate, each of the first active device arrays comprising a thin film transistor, a storage capacitor, and a transparent electrode electrically connected to the thin film transistor;
a first insulating layer disposed above the first active device arrays;
a plurality of first spacers disposed on the first substrate and supporting the first insulating layer, so as to form a first containing space between the first insulating layer and the first active device arrays;
a plurality of second active device arrays disposed on the first insulating layer, each of the second active device arrays comprising a thin film transistor, a storage capacitor, and a transparent electrode electrically connected to the thin film transistor;
a second substrate comprising an electrode layer disposed thereon, the electrode layer arranged opposite to the first substrate, and the electrode layer is located between the second substrate and the second active device arrays;
a plurality of second spacers disposed on the first insulating layer and supporting the second substrate, so as to form a second containing space between the second substrate and the second active device arrays; and
a plurality of liquid crystal layers respectively disposed in the first containing space and the second containing space.

\* \* \* \* \*